United States Patent [19]

Principe et al.

[11] 4,371,309

[45] Feb. 1, 1983

[54] AIR TABLE

[76] Inventors: William L. Principe, 2594 Weigelia Rd., NE., Atlanta, Ga. 30345; Jacky L. Fowler, 1991 N. Oak Dr., Lawrenceville, Ga. 30245

[21] Appl. No.: 237,929

[22] Filed: Feb. 25, 1981

[51] Int. Cl.³ .................. B65G 35/00; B65G 51/02
[52] U.S. Cl. ................................ 414/676; 406/19; 406/88
[58] Field of Search ............... 414/676, 903; 406/10, 406/12, 19, 88, 94, 95, 192; 269/20

[56] References Cited

U.S. PATENT DOCUMENTS

| | | | |
|---|---|---|---|
| 1,223,586 | 4/1917 | Johnson | 406/192 X |
| 3,081,886 | 3/1963 | Flexman et al. | 414/676 |
| 3,257,964 | 6/1966 | Conners | 406/19 X |
| 3,260,285 | 7/1966 | Vogt | 406/192 X |
| 3,706,476 | 12/1972 | Thomas-Collignon | 406/19 |
| 4,077,507 | 3/1978 | Boquet | 414/676 X |

FOREIGN PATENT DOCUMENTS 1331881  9/1973  United Kingdom .................. 406/19

Primary Examiner—Leslie J. Paperner
Attorney, Agent, or Firm—Newton, Hopkins & Ormsby

[57] ABSTRACT

An improved air table of the type having an article support surface with a plurality of holes therethrough, the holes being in communication with their respective air pipes which laterally project in spaced relationship from a longitudinally extending air manifold that is connected to a source of pressurized air. An air tube and the respective holes are associated with each of the juxtaposed sections of the table which form the support surface. The improvement comprises a valve on each of the pipes to restrict the flow of air from the manifold to the holes, the valve operable by an actuating responsive to an article being on or adjacent to a section so as to allow the air to be delivered to a selective section to maintain the article above the table surface as the article is moved to the next section.

3 Claims, 11 Drawing Figures

AIR TABLE

BACKGROUND OF THE INVENTION (1) Field of the Invention

The present invention relates to an article support system and, more particularly, to an improved air table.

(2) Description of the Prior Art

It is old in the art to use work tables that utilize pressurized air blown through holes in the table surface to move articles therealong, as in the garment industry with spreads of cloth. The blown air floats the cloth above the table surface, the cloth being piled on the table from a few ply to as many as 200 ply and in spread lengths of from 2 or 3 yards to as many as 20 to 30 yards. The spreads are floated to wherever required which is usually to the automatic cutting machines.

Normally, high volume low pressure air is applied simultaneously through all of the holes along the entire length of the table in order to accomplish this float, thereby requiring several air blowers with an attendant large amount of power consumption. The old tables are, therefore, inefficient and expensive.

SUMMARY OF THE INVENTION

The disadvantages of the prior art are overcome by the present invention which provides for the delivery of pressurized air to only a selected, desired section of the work table in order to move an article, such as spreads of cloth, from that section to at least the next adjacent section. The invention is utilized on air tables of the type having a flat work surface with a plurality of air holes therethrough. The surface is divided along its length into a number of sections, each section having an air pipe which laterally extends from an air manifold which is connected to an air blower. Flexible tubing connects each hole with its respective air pipe.

A valve means is on each air pipe to control the flow of air therethrough between the manifold and the holes associated with each air pipe and is operable by an actuating means which is responsive to the spread of cloth being on that particular section. Normally, each of the valve means is in the closed position so that the blown air does not reach the air holes for that section in the table surface. When the actuating means senses the cloth on a particular section of the table, the valve means on the air pipe for that section is actuated so as to move to an open position, allowing the delivery of the pressurized air to the air holes and "floating" the cloth above the surface. The cloth can then be easily moved to the next work section on the table.

The valve means comprises a pinch or bladder valve which is operable between its open and closed positions by means of compressed air acting on a flexible diaphragm to transversely constrict by a pinching action to allow or restrict the flow of air therethrough. A slide valve assembly is disposed on the air line between the pinch valve and a second source of pressurized air, the slide valve being normally open to allow the pressurized air from the second source to act on the diaphragm to pinch it close.

The actuating means is connected to the slide valve assembly. The first embodiment of the actuating means involves a level arm which extends up through a slot in each of the sections and is pivotally mounted to the slide valve assembly. The spread of cloth engages the arm to pivot it downwardly, causing the slide valve to close. The air flow from the second source to the diaphragm is cut off, allowing the diaphragm to radially expand so that the pressurized air flowing through the manifold from the first source travels through the respective air pipe to the air holes associated with that section to float the spead.

In the second embodiment, pressurized air from a third source is continually passed upwardly through one of the air holes of each section. That air hole is in communication with a spool valve that is in communication with the slide valve assembly and which is normally in a closed position so as to prevent pressurized air from a fourth source from acting upon the slide valve. When the cloth moves over that air hole, the back pressure of the pressurized air from the third source opens the spool valve so that the air from the fourth source moves the slide valve to its closed position, opening the pinch valve and allowing pressurized air to flow through the air holes of that particular section.

It is, therefore, a primary object of the present invention to provide an improved air table wherein pressurized fluid is independently delivered to a selected section of the table only when needed.

Another object of the present invention is to provide a valving system for an air table whereby pressurized air may flow to individual sections of the table, as needed.

A further object of the present invention is to provide a low-cost and power-efficient air table.

DETAILED DESCRIPTION OF THE ILLUSTRATIVE EMBODIMENTS

Figure 1:
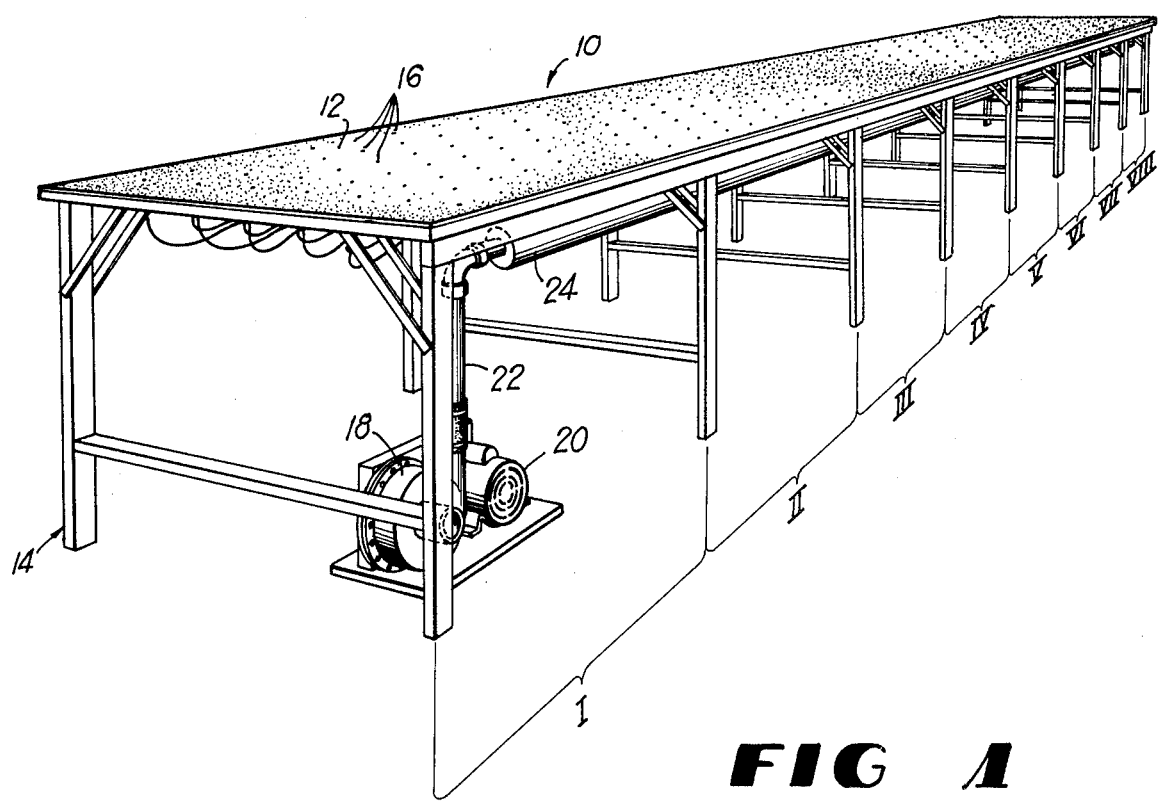
FIG. 1 is a perspective view of the air table of the present invention.
Figure 2:
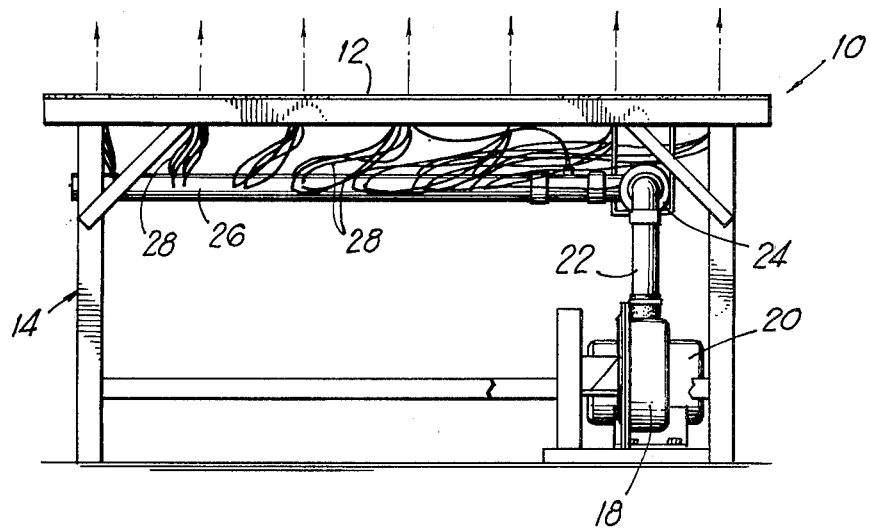
FIG. 2 is a front end view of the table.

Referring to the figures of the drawings, the numeral 10 represents generally the air table of the present invention. As seen in FIGS. 1 and 2, the table 10 includes a flat, rectangular-shaped article support surface 12 which is generally constructed of chipboard and which is maintained above the floor by means of a support frame that is generally designated by the numeral 14. A plurality of air holes 16 extend through the surface 12 in a regular, spaced attitude along its length.

Pressurized fluid (normally air) is delivered to the holes 16 by means of a conventional air blower 18 powered by motor 20. The discharge end of exhaust pipe 22 from blower 18 is connected to one end of an air manifold 24 that longitudinally extends beneath surface 12 adjacent one of its sides. The other end of manifold 24 is closed. The horsepower of motor 20 may vary, depending upon the load requirements.

Cylindrical air pipes 26 laterally extend from manifold 24 beneath surface 12 in spaced, parallel relationship along the length of the table 10. The air pipes 26 are perforated, with flexible tubing 28 interconnecting each perforation with each air hole 16. Each pipe 26 defines a separate section I, II, etc. on the table 10, each section being of equal dimensions. A typical table 10 is 100 feet in length, made up on 4-foot sections.

Figure 3:
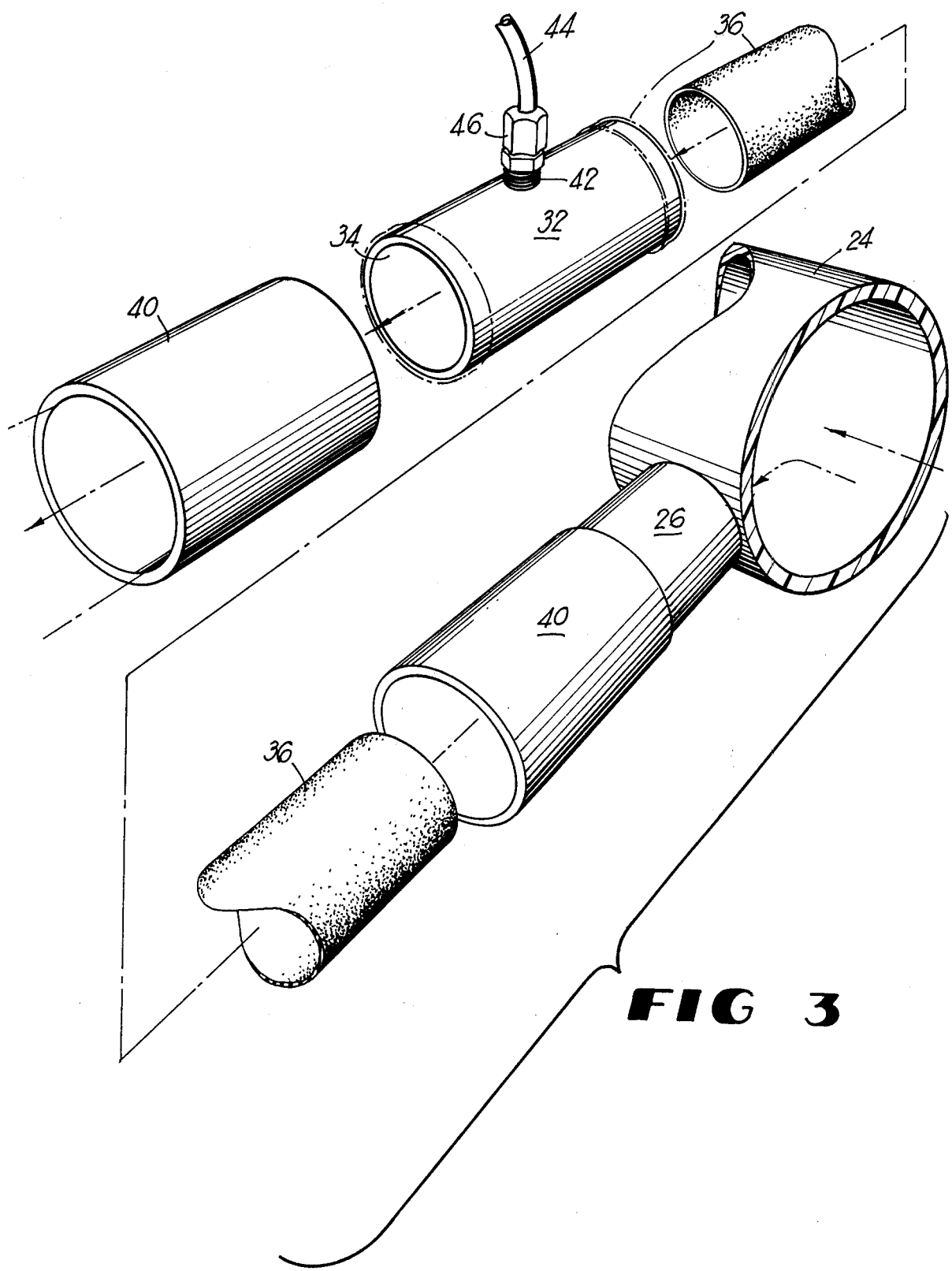
FIG. 3 is a partial, exploded perspective view of the valve means of the present invention.
Figure 4:
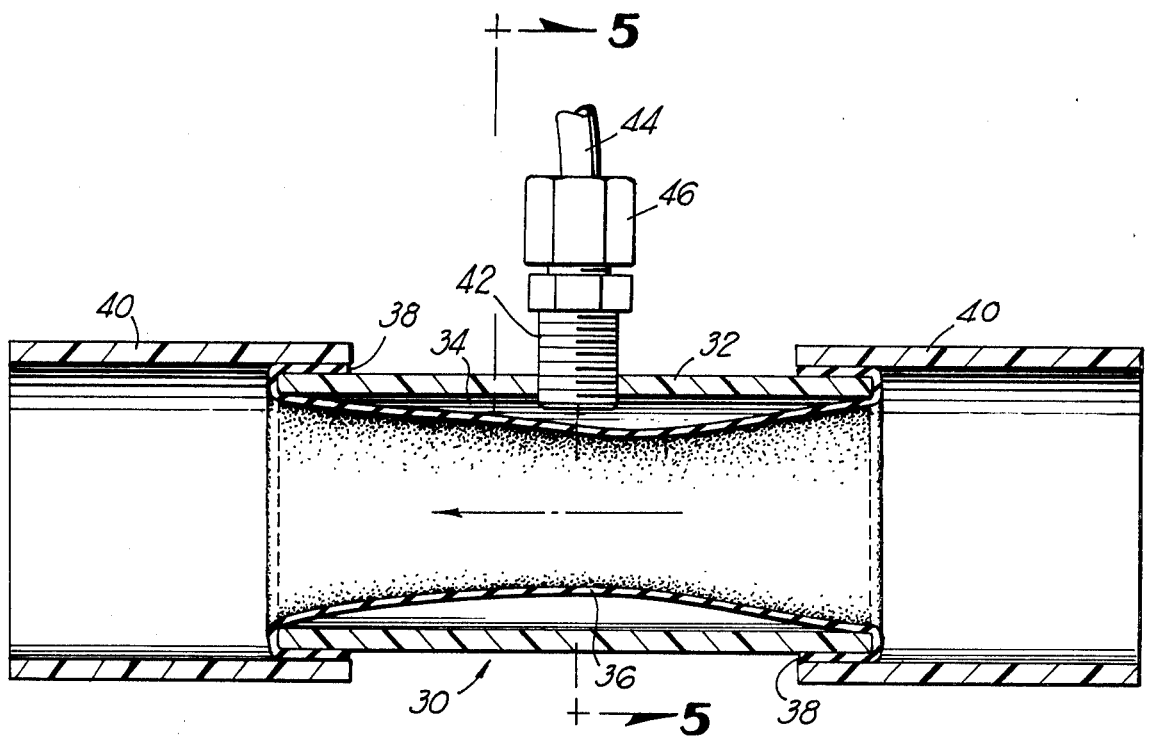
FIG. 4 is a cross-sectional side elevation view of the valve means.
Figures 5, 6:
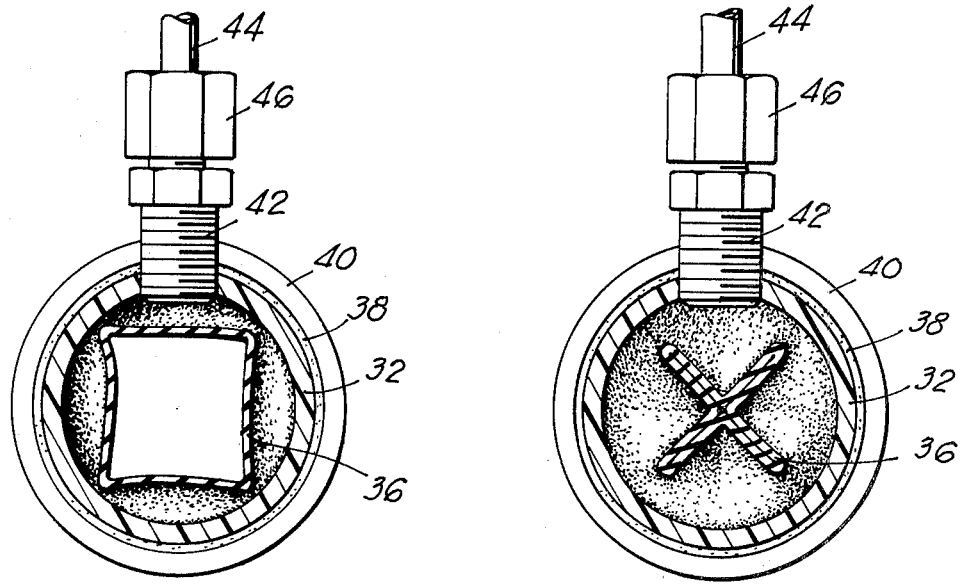
FIG. 5 is a view taken along lines 5—5 in FIG. 4 showing the valve in the open position.
FIG. 6 is a view similar to FIG. 5 showing the valve in the closed position.

Referring to FIGS. 3 and 4, a valve means is shown on an air pipe 26 and includes a sleeve type pinch or bladder valve which is generally referenced by numeral 30. The valve 30 comprises a cylindrical valve sleeve 32 that is approximately of the same diameter as pipe 26 and which defines an inner air chamber 34. A flexible, circular diaphragm 36 of elastomeric material is disposed within chamber 34 and is of a greater length than sleeve 32. The end portions 38 of the diaphragm 36 are folded over the outer surface of the sleeve 32 and are held in sealing air-tight engagement therewith by means of flange members 40 which are of a greater diameter than air pipe 26 and which join the valve 30 to the pipe 26. Typically, 2-inch diameter PVC pipe that is approximately 5 inches long is utilized for each valve 30.

Figure 7:
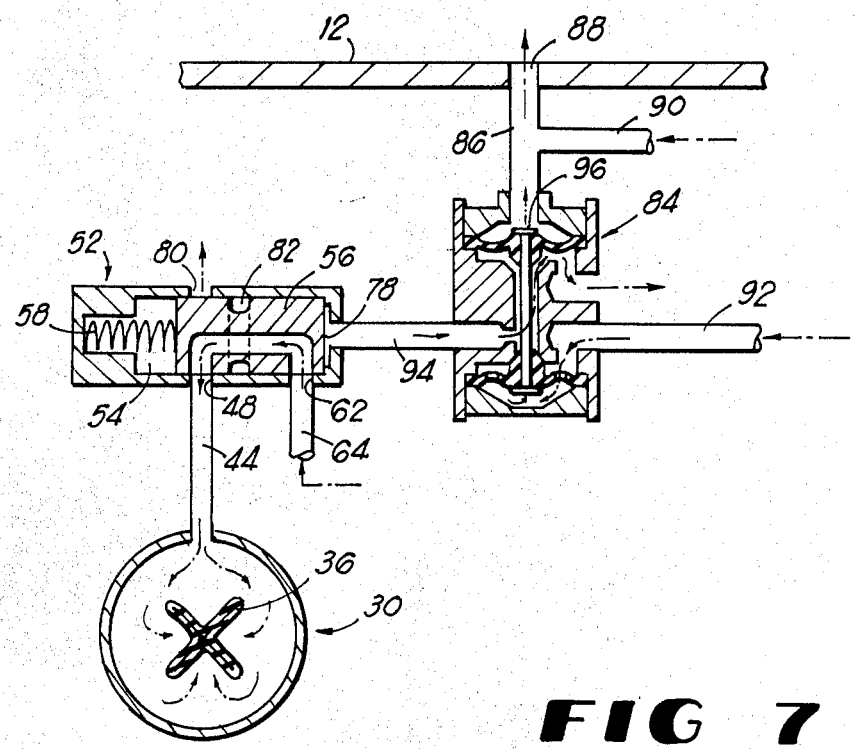
FIG. 7 is a partial, cross-sectional, side elevation view of the second embodiment of the actuating means, with the valve means in the closed position.
Figure 8:
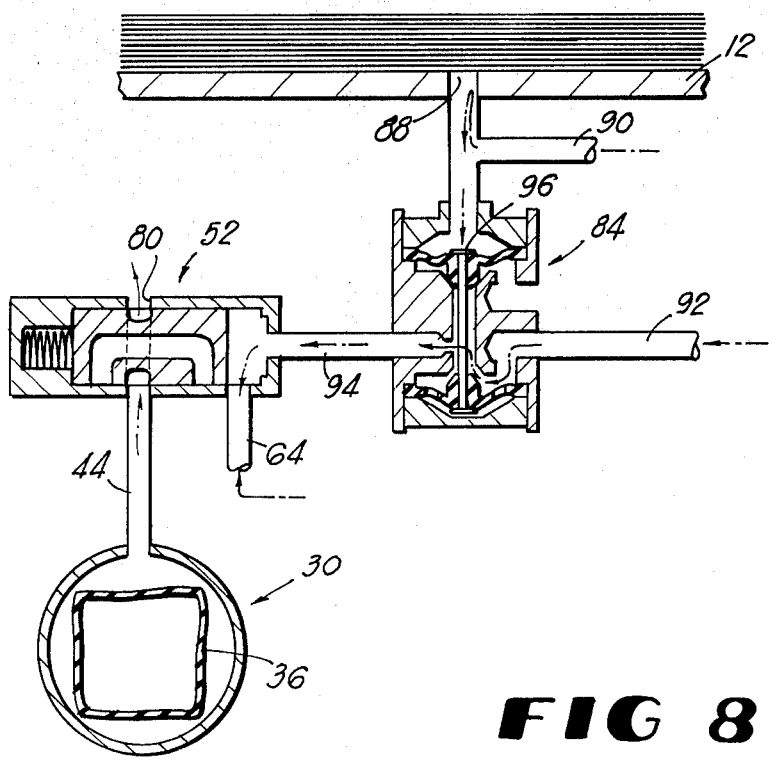
FIG. 8 is a view similar to FIG. 7 with the valve means in the open position.

A hollow threaded connection 42 extends into chamber 34 with air line 44 being connected thereto by means of complimentary threaded coupling nut 46. As seen in FIGS. 7 and 8, the air line 44 extends into the outlet opening 48 through the housing 50 of valve 52. The valve 52 includes a chamber 54 in which a piston 56 is slidably disposed, the piston 56 being biased by spring 58 into the position as shown in FIG. 7 whereby the respective ends of the passageway 60 through piston 56 are in registration with outlet opening 58 and intake opening 62. Air line 64 connects the intake opening 62 with a source of pressurized air, shown in FIG. 10 as numeral 66, through line 68 and pressure regulator 70.

Means is provided for actuating the valve 52 to move piston 56 between an open position as shown in FIG. 7 and a closed position as shown in FIG. 8. Two embodiments of the actuating means are disclosed.

Figure 10:
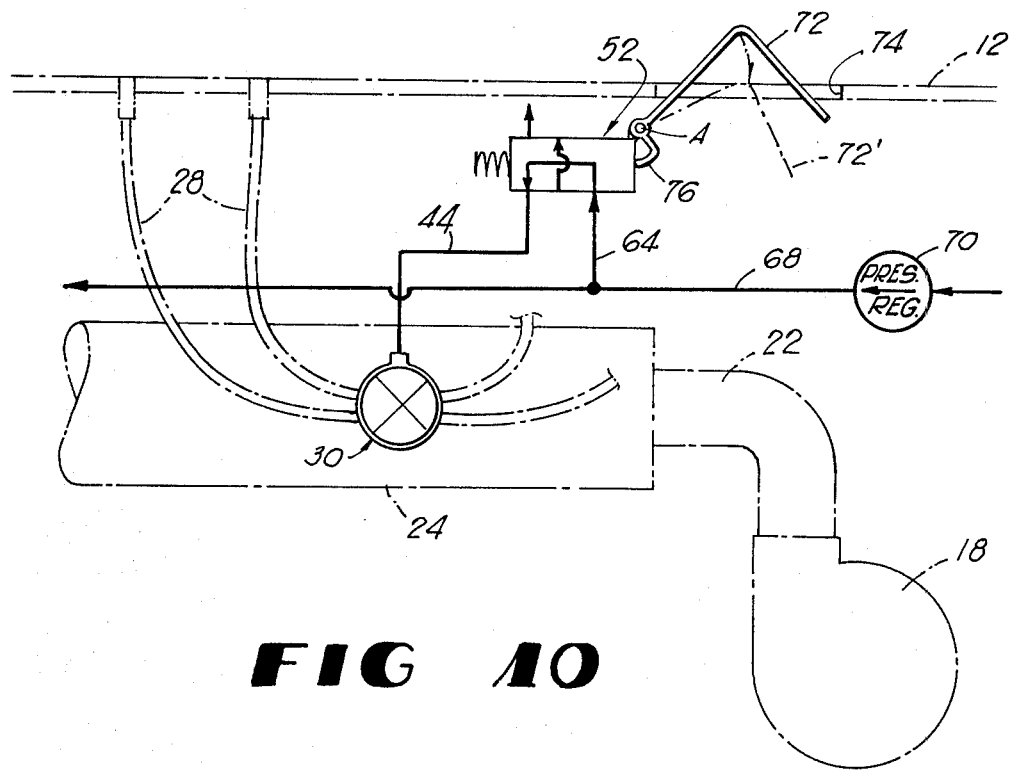
FIG. 10 is a schematic representation of the first embodiment of the actuating means.

The first embodiment is shown in FIG. 10 and includes a rigid element or lever arm 72 that extends upwardly through a slot 74 formed in each section of surface 12 and is pivotally mounted on housing 50 at point A. The lower end 76 of arm 72 is designed to engage the front face 78 of piston 56 when the arm 72 contacts the cloth and is moved to position 72', thereby moving the piston 56 to its position as shown in FIG. 8. The air vent or exhaust opening 80 then is in registration with vertical channel 82 and outlet opening 48. When the cloth is removed from engagement with the arm 72, the arm 72' returns to its original position and piston 56 returns to its open position as shown in FIG. 7.

Figure 9:
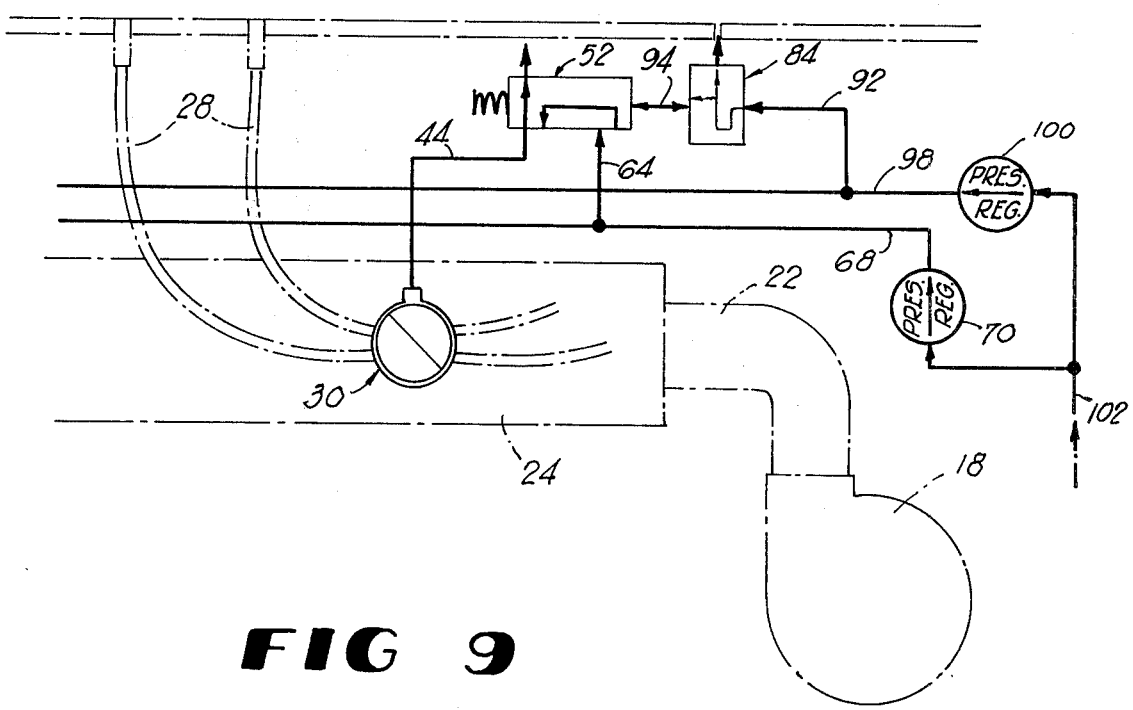
FIG. 9 is a schematic representation of the air flow through the second embodiment of the actuating means.

The second embodiment of the actuating means is shown in FIGS. 7-9 and comprises a spool valve 84 for each valve 52 and which is in communication with air line 86 which interconnects air hole 88 with air line 90 which is connected to a source of low pressure air (as, for example, 1 p.s.i.). Line 92 is a high pressure air line (such as 30 p.s.i.). Line 94 interconnects the chamber 54 of valve 52 with the valve 84.

A spindle 96 is normally in the position as shown in FIG. 7 whereby air flow between lines 92 and 94 is blocked. When the hole 88 becomes covered by the cloth, as shown in FIG. 8, the air back pressure in line 86 presses the spindle 96 downwardly, establishing communication between lines 92 and 94, thereby pushing piston 56 to its closed position, opening valve 30.

Figure 11:
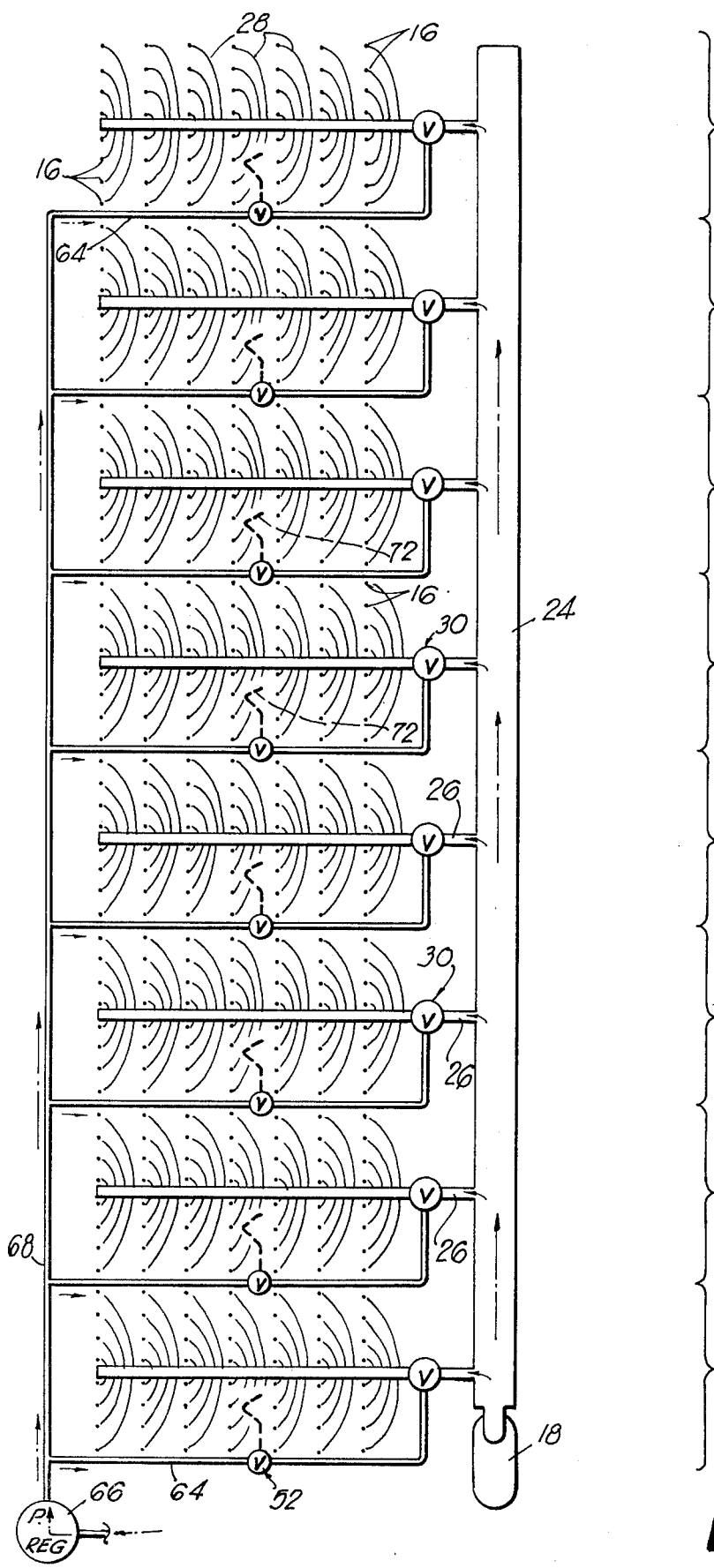
FIG. 11 is a schematic representation of the air flow through the table of the present invention.

Referring to FIGS. 10 and 11, line 68 is the main air feeder from air source 66 to the other lines 64 and valves 52 on the first embodiment of table 10. In FIG. 9, it can be seen that line 92 is off of main branch 98 which directs high pressure air to the remaining valves 84 in the second embodiment of the present invention. Pressure through line 98 is controlled by regulator 100. Lines 68 and 98 may branch off of main line 102 from a pressurized air source (not shown).

As an example of the utility of the present invention, a conventional air table which is 100 feet in length and 5½ feet wide normally requires 3 air blowers to force air through all of the holes in the table surface. With the air table 10, only one blower 18 is required for a 100 foot long table having 52 air holes in each 4 foot section, or a total of 25 air valves. The blower 18 can be 5 hp. with one (1) pound of pressure which will be sufficient pressure for 416 holes. Thus, the requirement for blower 18 is that it be capable of delivering high volume, low pressure air. The blower 66, on the other hand, should deliver high pressure, low volume air.

What is claimed is:

1. An improvement in an air table of the type having an article support surface with a plurality of openings therethrough, said surface comprising a plurality of juxtaposed sections along its length, a longitudinally extending air manifold, a source of pressurized air connected to said manifold and an air pipe for each section which laterally extends from said manifold beneath said surface and is in communication with the openings of the respective section, the improvement comprising:
    (a) valve means on each of said air pipes operable between open and closed positions to selectively deliver air from said mainfold through said air pipe to said openings; and
    (b) means on each of said sections and connected to said valve means thereon for selectively and independently actuating each of said valve means between said open and closed positions, said actuating means being responsive to an article on the respective section so as to maintain said article above said support surface while in transit between said sections, said air pipe including a longitudinally extending passageway defining a path of travel for said pressurized air and wherein said valve means is disposed in said passageway, said valve means being a pinch valve comprising a valve sleeve co-axially positioned in said air pipe and defining a chamber which is in flow communication with said passageway, a diaphragm secured within said chamber, an inlet on said sleeve in communication with said chamber, a source of fluid and a fluid line connecting said fluid source with said inlet whereby said diaphragm is selectively moved between an open position for air flow between said passageway and said chamber and thence to said openings and a constricted position to prevent said air flow, said actuating means including a means of sensing said article on said section and a fluid valve on said fluid line operable between open and closed position, said sensing means being connected to said fluid valve so that when said sensing means is actuated by said article, said fluid valve is moved to said closed position, thereby restricting the flow of fluid between said fluid source and said inlet to cause said diaphragm to move to said open position, and wherein said fluid valve is a slide valve having a valve housing defining a slide chamber, said housing having an intake opening in communication with said source of fluid and an outlet opening in communication with said inlet, a piston spring-biased within said chamber and having a passageway therethrough, said piston being movable from a first, normal position wherein the opposed ends of said passageway are in respective registration with said intake opening and said outlet opening and a second position wherein said opposed ends are out of said registration, and sensing means being connected to said position.

2. An improvement as claimed in claim 1 wherein said sensing means includes said surface of each section having a slot therethrough, a rigid element having one end normally extending through said slot in the path of travel of said article and its other end being in engagement with said piston, said element being pivotally mounted on said valve housing so that when said article engages said element, said element pivots downwardly to move said piston to said second position.

3. An improvement as claimed in claim 1 wherein said sensing means includes said surface of each section having an air hole therethrough, a spool valve, a source of low pressure fluid, first means for interconnecting said air hole with said source of low pressure fluid and with said spool valve, a source of high pressure fluid, second means for interconnecting said source of high pressure fluid with said spool valve and a third means for interconnecting said piston with said spool valve, said spool valve movable between a normally closed position being maintained by the low pressure fluid in said interconnecting means whereby said second and third interconnecting means are out of communication with each other so that said piston is in said first position and an open position when said article engages said low pressure fluid flowing through said air hole to allow said second and third interconnecting means to be in communication with each other so that said piston moves to said second position.

* * * * *